Sept. 30, 1924. 1,510,101
A. E. OSBORN
AUTOMATIC SLACK ADJUSTER
Filed May 22, 1922 2 Sheets-Sheet 1
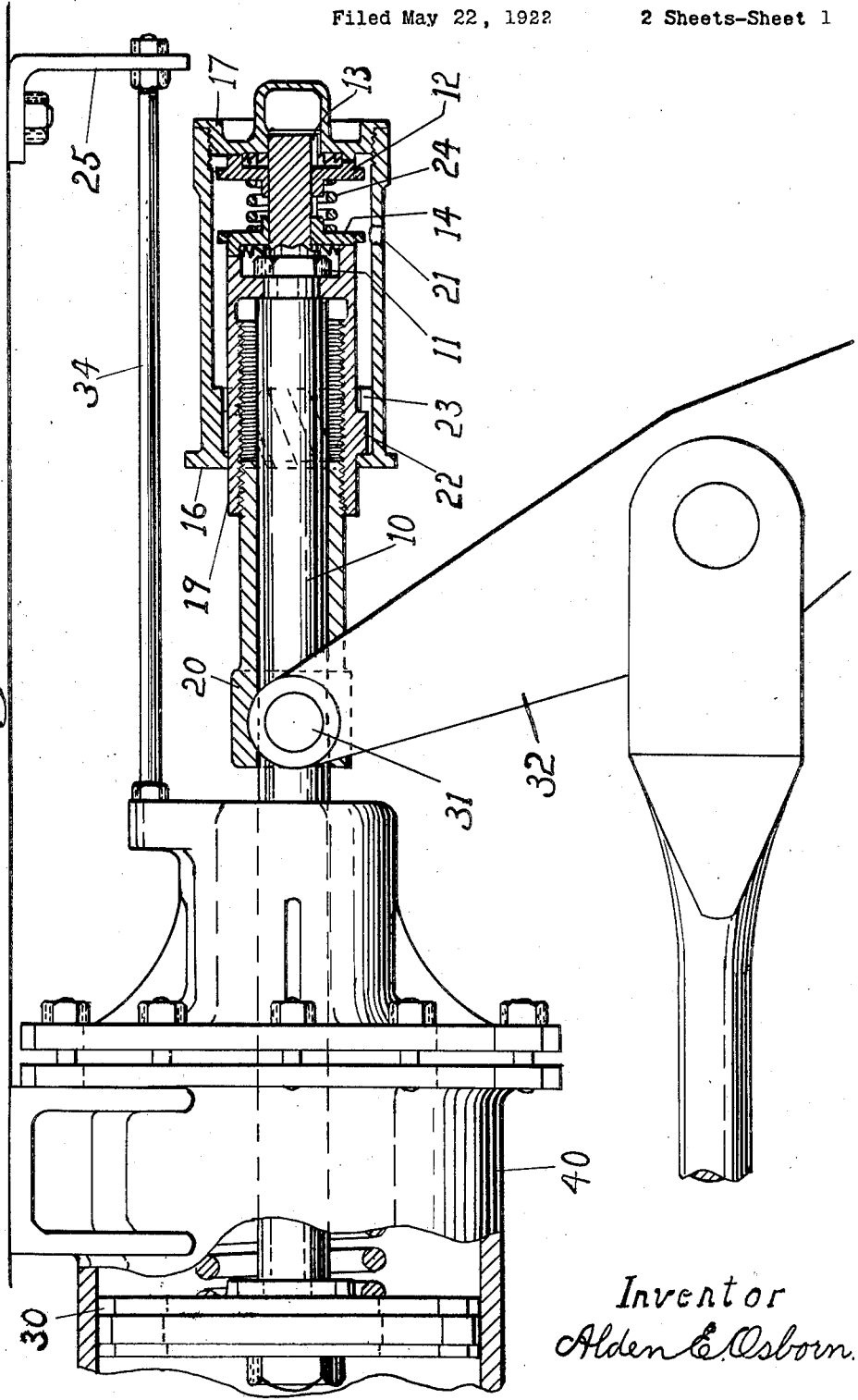
Inventor
Alden E. Osborn.

Sept. 30, 1924. 1,510,101
A. E. OSBORN
AUTOMATIC SLACK ADJUSTER
Filed May 22, 1922 2 Sheets-Sheet 2
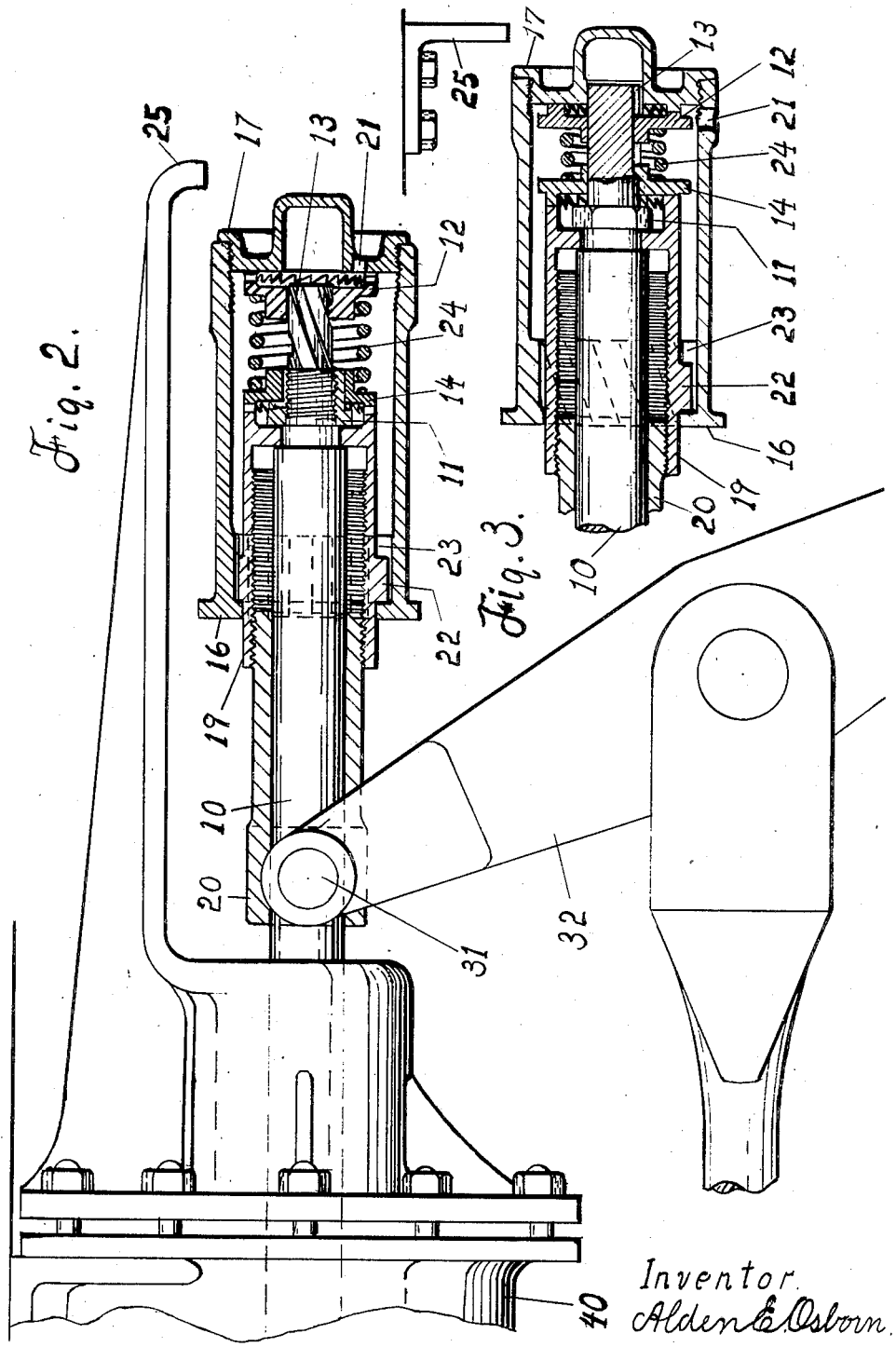

Patented Sept. 30, 1924.

1,510,101

UNITED STATES PATENT OFFICE.

ALDEN E. OSBORN, OF NEW YORK, N. Y.

AUTOMATIC SLACK ADJUSTER.

Application filed May 22, 1922. Serial No. 562,651.

*To all whom it may concern:*

Be it known that I, ALDEN E. OSBORN, a citizen of the United States of America, and a resident of New York, county of the Bronx, and State of New York, have invented certain new and useful Improvements in an Automatic Slack Adjuster, of which the following is a specification.

This invention relates to certain modifications and improvements in the automatically adjusting turnbuckle shown in my patent application Serial No. 425,588 filed Nov. 20, 1920, which has matured into a Patent No. 1,477,891, dated December 18, 1923, whereby this device is particularly suited for use as a slack adjuster for railway vehicle brakes. The invention also shows certain improvements in the method of applying such a slack adjusting device so that it would be actuated directly by the motion of the brake piston and makes the adjustment whenever the brake piston exceeds the desired amount of travel.

In the accompanying drawings:

Figure 1 shows a longitudinal partial sectional view of one form of my invention.

Figure 2 shows a longitudinal partial sectional view of a modification of Figure 1, and Figure 3 shows a still further modification.

In Figure 1 of the accompanying drawings, 10 indicates the brake piston rod which is attached to the brake piston 30 that is within the brake cylinder 40; these parts being of the design usually employed with railway air brakes. The piston rod 10 carries the sleeve 20 which is provided with suitable pivot pins 31 to which the lever 32, connected to the brake shoes of the vehicle, is pivoted. The sleeve 20 is arranged so that it can slide longitudinally on the piston rod 10, but normally moves with the rod and slides along it only when the adjustment for wear on the brake shoes is being made. It is provided with an external thread at one end which engages a thread on the nut or hollow sleeve 19 that is arranged so that it can be rotated by the device to cause the automatic adjustment but is provided with an internal flange between a shoulder on the rod 10 and a nut 11 so that it travels with the piston rod 10. The outside of this nut 19 is provided with suitable spiral keys 22 that engage keyways or grooves 23 in the interior of the barrel 16. This barrel is arranged so that it can be slid longitudinally along the parts when the flange on its inner end comes in contact with a suitable stationary stop 25, but is normally held in the position shown by a spring 24 that also keeps the ratchet teeth on the disc 12 in engagement with ratchet teeth on the cover 17 of this barrel 16 and the ratchet teeth on the disc 14 in engagement with suitable teeth on the nut 19. These two discs 12 and 14 are slidably keyed, thru engagement with the keyway 13, to the piston rod 10 and the teeth on the disc 12 are arranged to keep the barrel 16 from turning in one direction while those on the ratchet disc 14 are arranged to keep the nut from turning in the same direction. It will thus be seen that when the barrel is moved longitudinally along the piston rod it would, thru the action of the spiral keys, be permitted to turn by the ratchet teeth on the disc 12 and cover 17 allowing its movement in the required direction. Upon the barrel being released, the action of the spring 24 would force it to return to the position shown in the drawing and in so doing it would, because of the spiral keys, force the nut 19 to rotate in the desired direction, to adjust for wear on the brake shoes thru the action of its thread on the sleeve 20, the sleeve 20 due to this action moves towards the end of the piston rod. The ratchet teeth on the disc 14 which engage the ratchet teeth on the nut 19 prevent the nut from turning in a reverse direction and permits the sleeve 20 to move to release the adjustment. It will thus be seen that with the arrangement of the threaded adjustment, spiral keys and ratchet teeth shown, the adjustment would take place as the spring 24 pushes the barrel 16 back into its normal position. This automatic adjustment would act each time the barrel 16 is given a movement sufficient to engage a new set of teeth on the ratchet disc 12 and cover 17. Figure 2 represents a modification of the mechanism shown in Figure 1, in which the outer barrel 16 of the adjuster is connected to the nut 19 by straight keys 22 and 23, and one of the ratchet discs 12 has spiral keys which fit spiral keyways 13 on the end of the rod 10, so that the movement of the barrel, by means of the stop 25, would cause the rotation of the ratchet disc 12 to a new position in regard to the barrel and upon the expansion of the spring, the barrel would be turned thru the action of the spiral keys between the disc and the rod 10, and thus rotate the nut 19 to make the automatic adjustment.

In Figure 3, I have shown a still further modification of Figure 1, in which the direction of the spiral keys between the barrel and nut 19 is such that the nut would be rotated upon the barrel coming in contact with the stop 25. This arrangement could also be used with the type of adjuster shown in Figure 2, by simply having the spiral keys 13, and inter-meshing keyways slant in the opposite direction, the same as indicated with the nut and barrel keys in this present Figure 3, and, while under some conditions it might be desirable to so modify my device, it would, owing to the fact that the parts would be under great pressure when the the sleeve would come in contact with the stop, usually be desirable to have the nut rotated when the spring 24 is returning the parts to their normal position. The stop 25 may be placed at any suitable distance from the brake cylinder 40 to slide the barrel 16 to make the automatic adjustment at the desired point of travel of the piston, and I have shown it in Figure 1 as connected to the brake cylinder cover by means of a rod 34, which would make it only possible to place the stop at a pre-determined distance from the cylinder. This rod may be omitted, as shown in Figure 3, or the stop may be entirely carried by the cylinder cover as Figure 2, and thus save the necessity of separately attaching it to the car frame. In order to enable the nut 19 to be turned in a reverse direction so that the adjustment may be released, I have shown an opening 21 in the barrel 16 thru which a suitable rod or nail can be pressed against the ratchet disc 14 and thus release the ratchet teeth.

It should be understood that this invention is susceptible of embodiment in other forms without departure from its true spirit and scope as defined in the appended claims.

Having thus described my invention I claim as new and desire to secure by Letters Patent:—

1. In an automatic slack adjuster the combination with an air cylinder, a piston slidable therein and a piston rod connected to said piston and extending beyond the said cylinder of a sleeve surrounding said piston rod and longitudinally slidable on said piston rod, a brake operating lever pivotally connected to said sleeve, and means for automatically sliding said sleeve along said piston rod to move said pivotal connection of said lever in relation to said piston upon the said piston exceeding a pre-determined movement in said cylinder.

2. In an automatic slack adjuster the combination with an air cylinder, a piston slidable therein and a piston rod connected to said piston and extending beyond the said cylinder, of a threaded sleeve surrounding said piston rod and longitudinally slidable on said piston rod, a brake operating lever pivotally connected to said sleeve, a nut rotatably mounted on said piston rod and engaging the thread on said sleeve, and means for automatically rotating said nut upon the piston exceeding a pre-determined movement in said cylinder.

3. In an automatic slack adjuster the combination with an air cylinder, a piston slidable therein and a piston rod connected to said piston and extending beyond the said cylinder of, a member operated by said piston rod and slidable thereon, a brake operating means connected to said member, a stationary stop, and means actuated by contact with said stop for automatically moving said member in relation to said piston upon the piston exceeding a pre-determined movement in said cylinder.

4. In an automatic slack adjuster the combination with an air cylinder, a piston slidable therein and a piston rod connected to said piston and extending beyond the said cylinder, of a member operated by said piston rod and slidable thereon, a brake operating means connected to said member, a stationary stop, and means carried by said piston rod and actuated by contact with said stop for automatically moving said member in relation to said piston upon the piston exceeding a pre-determined movement in said cylinder.

5. In an automatic slack adjuster the combination with an air cylinder, a piston slidable therein and a piston rod connected to said piston and extending beyond the said cylinder, of a threaded sleeve longitudinally slidable on said piston rod, a brake operating lever pivotally connected to said sleeve, a nut rotatably mounted on said piston rod and engaging the thread on said sleeve, a longitudinally slidable element, and means whereby, when said slidable element is moved in relation to and parallel with the direction of motion of said piston rod, said nut is rotated to cause said sleeve to move in relation to said piston upon the piston exceeding a pre-determined movement in said cylinder.

6. In an automatic slack adjuster the combination with an air cylinder, a piston slidable therein and a piston rod connected to said piston and extending beyond the said cylinder, of a threaded sleeve longitudinally slidable on said piston rod, a brake operating lever pivotally connected to said sleeve, a nut rotatably mounted on said piston rod and engaging the thread on said sleeve, a stationary stop, a longitudinally slidable element, and means whereby said slidable element is moved by contact with said stop in relation to and parallel with the direction of motion of said piston rod to cause said nut to rotate about said sleeve to move said sleeve in relation to said piston upon the piston exceeding a pre-determined movement in said cylinder.

7. In an automatic slack adjuster the combination with an air cylinder, a piston slidable therein and a piston rod connected to said piston and extending beyond the said cylinder, of a threaded sleeve longitudinally slidable on said piston rod, a brake operating lever pivotally connected to said sleeve, a nut rotatably mounted on said piston rod and engaging the thread on said sleeve, a stationary stop, a longitudinally slidable barrel surrounding said nut, spiral keys between said nut and said barrel, and means whereby said slidable barrel is moved by contact with said stop in relation to and parallel with the direction of motion of said piston rod to cause said nut to rotate about said sleeve thru the action of said spiral keys to move the sleeve in relation to said piston upon the piston exceeding a pre-determined movement in said cylinder.

8. In an automatic slack adjuster the combination with an air cylinder, a piston slidable therein and a piston rod connected to said piston and extending beyond the said cylinder, of a threaded sleeve longitudinally slidable on said piston rod, a brake operating lever pivotally connected to said sleeve, a nut rotatably mounted on said piston rod and engaging the thread on said sleeve, a stationary stop, a longitudinally slidable barrel surrounding said nut, spiral keys between said nut and said barrel, and means whereby said slidable barrel is moved by contact with said stop in relation to and parallel with the direction of motion of said piston rod to cause said nut to rotate about said sleeve thru the action of said spiral keys to move the sleeve in relation to said piston when the piston exceeds a pre-determined movement in said cylinder and a spring for returning said barrel to its normal position when said barrel is out of contact with said stop.

9. In an automatic slack adjuster the combination with an air cylinder, a piston slidable therein and a piston rod connected to said piston and extending beyond the said cylinder, of a threaded sleeve longitudinally slidable on said piston rod, a brake operating lever pivotally connected to said sleeve, a nut rotatably mounted on said piston rod and engaging the thread on said sleeve, a stationary stop, a longitudinally slidable barrel surrounding said nut, spiral keys between said nut and said barrel and means for preventing the rotation of said nut in one direction, means for preventing the rotation of said barrel in one direction, and means whereby said slidable barrel is moved by contact with said stop in relation to and parallel with the direction of motion of said piston rod to cause said nut to rotate about said sleeve thru the action of said spiral keys to move the sleeve in relation to said piston upon the piston exceeding a pre-determined movement in said cylinder, and a spring for actuating said means for preventing the rotation of said nut and said barrel in one direction and for returning said barrel to its normal position when said barrel is out of contact with said stop.

10. In an automatic slack adjuster with an air cylinder, a piston slidable therein and a piston rod connected to said piston and extending beyond the said cylinder, of a threaded sleeve longitudinally slidable on said piston rod, a brake operating lever pivotally connected to said sleeve, a nut rotatably mounted on said piston rod and engaging the thread on said sleeve, a stationary stop, a longitudinally slidable barrel surrounding said nut, spiral keys between said nut and said barrel, a spring for returning said barrel to its normal position, means whereby when the piston exceeds a pre-determined movement in said cylinder said slidable barrel is moved by contact with said stop in relation to and parallel with the direction of motion of said piston rod and compresses said spring, and means for rotating said nut to move the said sleeve in relation to said piston, thru the action of the said spiral keys, when said barrel returns to its normal position upon its withdrawal from contact with said stop.

11. In an automatic slack adjuster the combination with an air cylinder, a piston slidable therein and a piston rod connected to said piston and extending beyond the said cylinder, of a member operated by said piston rod and slidable thereon, a brake operating means connected to said member, means for automatically adjusting the said member in relation to the said piston upon the said piston exceeding a pre-determined movement in said cylinder said means coming into action thru contact with a relatively stationary stop and means for determining the position of said stop in relation to said cylinder comprising a rigid connection between said stop and said cylinder.

12. The combination of an adjustable member, a rotatable adjusting element, a relatively long internal thread on one of said parts, an extension on the other of said parts, fitting within said internal thread and having an external thread at its end co-acting with said internal thread, whereby said external thread is within and protected by said internal thread during the entire movement of said adjustable member, a reciprocating element having a pre-determined amount of travel, and means for rotating said adjusting element to cause said movement of said adjustable member when said reciprocating element exceeds its said pre-determined amount of travel.

In witness whereof, I have hereunto set my hand this 20th day of May, 1922.

ALDEN E. OSBORN.